United States Patent
Li et al.

(10) Patent No.: US 8,832,690 B1
(45) Date of Patent: Sep. 9, 2014

(54) MULTI-THREADED VIRTUAL MACHINE PROCESSING ON A WEB PAGE

(75) Inventors: Peng Li, Seattle, WA (US); Vijay Menon, Seattle, WA (US)

(73) Assignee: Google Inc., Mountain View, CA (US)

( * ) Notice: Subject to any disclaimer, the term of this patent is extended or adjusted under 35 U.S.C. 154(b) by 494 days.

(21) Appl. No.: 13/164,933

(22) Filed: Jun. 21, 2011

(51) Int. Cl.
- G06F 9/455 (2006.01)
- G06F 9/46 (2006.01)
- G06F 15/173 (2006.01)
- G06F 13/00 (2006.01)

(52) U.S. Cl.
USPC ............... 718/1; 718/104; 709/226; 719/318

(58) Field of Classification Search
None
See application file for complete search history.

(56) References Cited

U.S. PATENT DOCUMENTS

| | | | |
|---|---|---|---|
| 6,430,616 B1 * | 8/2002 | Brinnand et al. | 709/224 |
| 6,598,068 B1 | 7/2003 | Clark | |
| 6,728,960 B1 | 4/2004 | Loomans | |
| 8,468,535 B1 * | 6/2013 | Keagy et al. | 718/104 |
| 2005/0132363 A1 | 6/2005 | Tewari et al. | |
| 2005/0160424 A1 | 7/2005 | Broussard et al. | |
| 2006/0271931 A1 | 11/2006 | Harris et al. | |
| 2008/0271020 A1 | 10/2008 | Leitz et al. | |
| 2009/0100164 A1 | 4/2009 | Skvortsov et al. | |
| 2009/0183152 A1 | 7/2009 | Yang et al. | |
| 2009/0193414 A1 * | 7/2009 | Broussard et al. | 718/1 |
| 2009/0210809 A1 * | 8/2009 | Bacus et al. | 715/764 |
| 2009/0287824 A1 | 11/2009 | Fisher et al. | |
| 2010/0070980 A1 * | 3/2010 | Tanaka et al. | 719/318 |
| 2010/0115530 A1 | 5/2010 | Ahmad et al. | |
| 2010/0306173 A1 | 12/2010 | Frank | |
| 2010/0333100 A1 | 12/2010 | Miyazaki et al. | |
| 2011/0082984 A1 | 4/2011 | Yuan | |
| 2011/0179253 A1 * | 7/2011 | Yehuda et al. | 712/42 |
| 2011/0282940 A1 | 11/2011 | Zhang et al. | |
| 2012/0174121 A1 * | 7/2012 | Treat et al. | 719/318 |
| 2012/0317642 A1 * | 12/2012 | Royal et al. | 726/22 |

OTHER PUBLICATIONS

Brinkschulte, U. et al., "A Multithreaded Java Microcontroller for Thread-Oriented Real-Time Event Handling", *Eighth Int'l Conf. on Parallel Architectures and Compilation Techniques (PACT'99)*, Oct. 12-16, 1999, pp. 34-39.

Gustafsson, A., "Threads Without the Pain", *ACM Queue*, Nov. 2005, pp. 43-47.

Maki, D. And Iwasaki, H., "JavaScript Multithread Framework for Asynchronous Processing", *IPSJ Transactions on Programming*, vol. 48, SIG 12 (PRO 34), pp. 1-18, Aug. 2007.

Schaumont, P. et al., "Cooperative Multithreading on Embedded Multiprocessor Architectures Enables Energy-scalable Design", *DAC'5*, Anaheim, CA, Jun. 3-17, 2005, 4 pages.

* cited by examiner

*Primary Examiner* — Meng An
*Assistant Examiner* — Tammy Lee
(74) *Attorney, Agent, or Firm* — Sterne, Kessler, Goldstein & Fox P.L.L.C.

(57) ABSTRACT

A system, method and a computer-readable medium for processing resources on a multithreaded browser. The browser includes a main thread and receives a resource. The browser initializes the main thread, the main thread includes an event loop and initializes a plurality of virtual machines, one virtual machine for each code segment within the resource. Each virtual machine includes a UI thread and is configured to share the main thread within the browser with the UI thread. Each UI thread is further configured to execute an event scheduled on the event loop on the virtual machine.

24 Claims, 6 Drawing Sheets

100

MULTI-THREADED VIRTUAL MACHINE PROCESSING ON A WEB PAGE

BACKGROUND

The emergence and development of computer networks and protocols, including the World Wide Web (or simply "the web"), allows users to access a wide variety of websites, and download webpages from those websites.

When a client receives web pages using a conventional web browser, a single event thread executes scripts embedded in webpages using a single virtual machine. Because scripts are executed using a single thread within a browser, scripts cannot be executed in parallel and impact the web browser's performance.

BRIEF SUMMARY

A system, method and a computer-readable medium processes resources on a multithreaded browser. The browser includes a main thread and receives a resource. The browser initializes the main thread. The main thread includes an event loop and initializes a plurality of virtual machines, one virtual machine for each code segment within the resource. Each virtual machine includes a user interface (UI) thread and is configured to share the main thread within the browser with the UI thread. Each UI thread is further configured to execute an event scheduled on the event loop on the virtual machine.

A system, method and a computer-readable medium processes a stop-the-world event on a browser. The browser includes a main thread. The main thread receives the stop-the-world event issued by a virtual machine. The main thread asynchronously schedules the stop-the-world event using an event loop. When the main thread retrieves the stop-the-world event from the event loop, the main thread attaches to the virtual machine that issued the stop-the-world event and processes the event within the virtual machine.

A system, method and a computer-readable medium context switches on a browser. The browser includes a main thread. The main thread executes an event handler associated with a first virtual machine. While executing on the first virtual machine, the main thread receives a call to access an event handler associated with a second virtual machine from the event handler within the first virtual machine. The main thread saves a record associated with the first virtual machine on the main thread and context switches from the first virtual machine to the second virtual machine. The main thread executes the event handler on the second virtual machine and returns to execute the event handler on the first virtual machine once the execution on the second virtual machine is complete.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
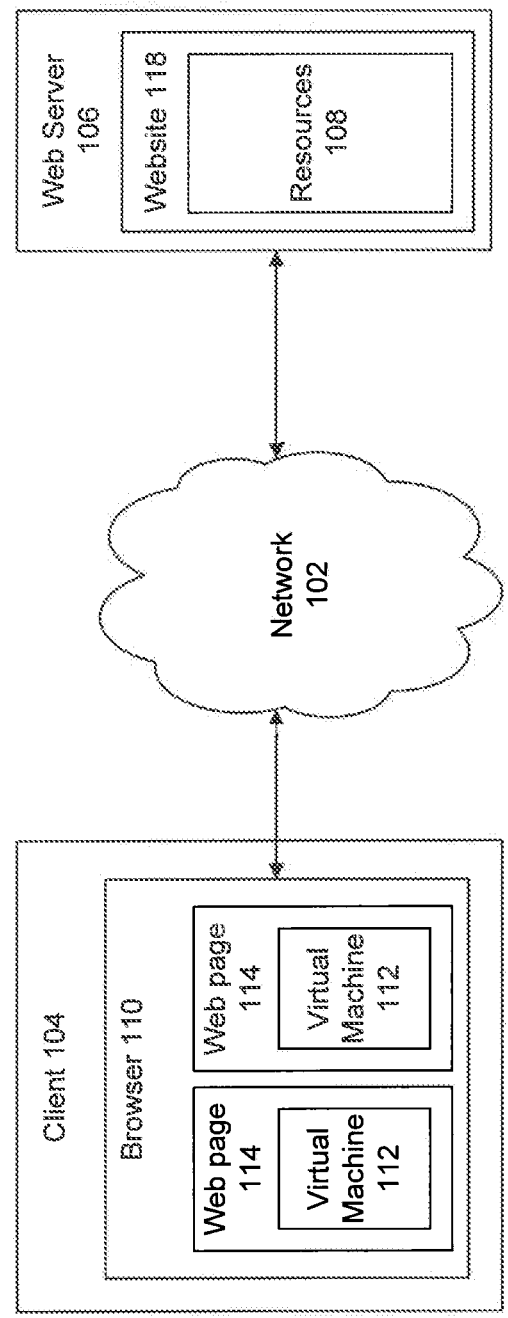
FIG. 1 is a block diagram of a distributed system environment capable of sending and receiving resources using a World Wide Web.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of a distributed system environment 100 capable of sending and receiving resources using the World Wide Web. Distributed system environment 100 includes one or more networks 102, clients 104 and web servers 106.

Network 102 may be any network or combination of networks that can carry data communication. Such a network 102 may include, but is not limited to, a local area network, metropolitan area network, and/or wide area network such as the Internet. Network 102 can support protocols and technology including, but not limited to, Web protocols and/or services. Intermediate web servers, gateways, or other servers may be provided between components of the system shown in FIG. 1 depending upon a particular application or environment.

Web server 106 is a computing device or an application executing on a computing device that helps deliver resources 108 from websites 118 to clients 104. Website 118 includes one or more resources 108 associated with a domain name and hosted by one or more web servers 106. An example website is a collection of webpages formatted in hypertext markup language (HTML) that can contain text, images, multimedia content, and programming elements, such as scripts.

A resource 108 is any data that can be provided over network 102. Resource 108 is identified by a resource address that is associated with resource 108. Resources 108 include HTML pages, word processing documents, and portable document format (PDF) documents, images, video, and feed sources, to name only a few. Resources 108 can include content, such as words, phrases, images and sounds, that may include embedded information (such as meta-information in hyperlinks) and/or embedded instructions (such as JavaScript code).

Client 104 is an electronic device that is under the control of a user and is capable of requesting and receiving resources 108 over network 102. Example clients 104 include personal computers, mobile communication devices, (e.g. smartphones, tablet computing devices, notebooks), set-top boxes, game-console embedded systems, and other devices that can send and receive data over the network 102.

Client 104 typically includes a user application, such as a web browser (or browser) 110 that facilitates the sending and receiving of resources 108 over network 102. Browser 110 displays resources 108 as webpages 114.

Browser 110 displays webpages 114 using one or more virtual machines 112. Virtual machine 112 is a software implementation of a computing device, such as client 104, capable of executing software applications or processes. Virtual machine 112, such as a Java Virtual Machine ("JVM"), may execute a single process or application. Virtual machine 112 is created in the beginning of the process and is destroyed when the process completes.

Each virtual machine 112 executes a process in an isolated domain. Processes executing in an isolated domain do not share objects, variables or static classes with processes outside of the isolated domain.

Virtual machine 112 processes software code embedded in webpages 114. Example software code may be Java or JavaScript code embedded in webpage 114 using script tags, such as HTML script tags. Each virtual machine 112 processes software code embedded in one webpage 114 (or "frame").

Because one or more virtual machine 112 display webpage 114, resources 108 that display multiple webpages 114 may include nested frames. Nested frames include parent frames and children frames. For example, a parent frame may include one or more child frames. Because each virtual machine 112 operates on any one particular frame in the isolated domain, different virtual machines 112 process the source code in the parent and child frames, yet do not share variables or objects that may contain overlapping or dependent data.

There is limited communication between virtual machines 112 that process parent and child frames. For example, one virtual machine 112 may communicate with other virtual machines 112 using an application programming interface (API) provided by the Document Object Model ("DOM"). A person skilled in the art will appreciate that DOM is a cross-platform, language-independent convention that represents and interacts with objects contained in HTML, XHTML and XML tagged resources 108. For example browser 110 parses resources 108 into a DOM tree.

Because of the limited communication, conventional browsers use one virtual machine to process resources. Because one virtual machine processes the webpages associated with a resource, those conventional browsers may not be as efficient or as fast as a browser 110 that includes multiple virtual machines 112 that each process a webpage.

System Architecture

Figure 2:
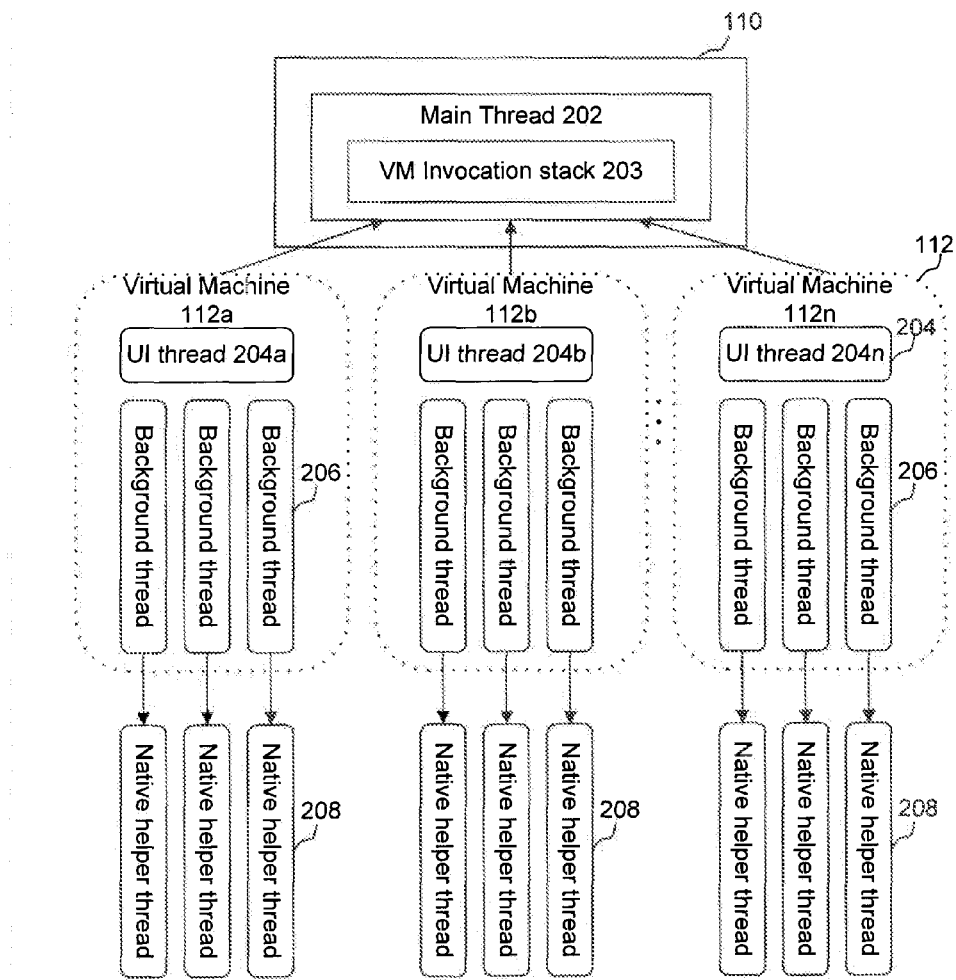
FIG. 2 is an exemplary multithreading browser.

FIG. 2 is a block diagram of an environment 200 of a multithreaded browser.

Environment 200 includes multiple threads that execute on browser 110 and virtual machines 112.

Browser 110 executes a main thread 202. Main thread 202 is a native thread provided to browser 110 by an operating system or a browser runtime. Main thread 202 is an event-driven thread that creates virtual machine 112. Each created virtual machine may be virtual machine 112a, virtual machine 112b, etc. Main thread also schedules and dispatches events for execution to virtual machines 112 using an event loop.

For example, main thread 202 creates virtual machine 112 and the associated isolated domain for each webpage 113 that includes software code using a JNI_CreateJavaVM method below:
    jint    JNI_CreateJavaVM(JavaVM    p_vm,    JNIEnv p_env, void *mv_args);

Main thread 202 may create up to n virtual machines 112, where n is a maximum number of virtual machines 112 that can execute on client 104.

Each virtual machine 112 executes a user interface (UI) thread 204, such as UI thread 204a executing on virtual machine 112a, UI thread 204b executing on virtual machine 112b, etc., and multiple background threads 206. UI thread 204 and background thread 206 may be Java threads. A Java thread is a thread defined in the Java's "java.lang.Thread" library so that the Java thread's local state is visible to the JVM. Once created, main thread 202 attaches to UI thread 204 within virtual machine 112 and dispatches workload to UI thread 204.

UI thread 204 is an event-driven thread that receives dispatched events from main thread 202. For example, UI thread 204 uses main thread 202 to communicate with the DOM tree and processes DOM events. Multiple UI threads 204 share main thread 202 in a cooperative mapping. A person skilled in the art will appreciate that in the cooperative mapping, one resource is shared by multiple processes. For example, each UI thread 204 is mapped to main thread 202 one thread at a time, resulting in an N:1 mapping.

In one embodiment, only one UI thread 204 may exist in each virtual machine 112.

Background thread 206 is an event-driven thread that executes in the background of virtual machine 112. Background thread 206 is a work thread that communicates with UI thread 204 within virtual machine 112 and processes work received from UI thread 204. Multiple background threads 206 may exist on virtual machine 112.

Environment 200 also includes native helper thread 208. Native helper thread 208 is a system thread operating on client 104. Typically, native helper thread 208 is included in a native helper thread pool that is administered by the operating system on client 104. Each native helper thread 208 is mapped to each background thread 206 in a 1:1 mapping. Background thread 206 processes workload received from UI thread 204 using native helper thread 208.

As described herein, main thread 202 is a native thread that is shared cooperatively by multiple UI threads 204 in an event-driven model. For example, main thread 202 reaches an event loop and dispatches events to multiple virtual machines 112. Main thread 202 dispatches events to virtual machine 112 by invoking an event handler included in UI thread 204. For example, when main thread 202 contains an event that requires processing on virtual machine 112a, main thread 202 attaches itself to UI thread 204a that will process the event. In one embodiment, main thread 202 may create a new virtual machine 112b and attach itself to the newly created UI thread 204b.

After main thread 202 attaches to UI thread 204, main thread 202 activates the event handler and assigns the workload to UI thread 204. Once the workload is assigned, main thread 202 detaches itself from UI thread 204 as UI thread 204 begins to process the workload.

Once virtual machine 112 completes processing the workload, main thread 202 may terminate virtual machine 112. For example, when main thread 202 does not have any workload in its memory stack to allocate to virtual machine 112, it may elect to destroy virtual machine 112. Main thread 202 may destroy virtual machine 112 using a DestroyJavaVM method, such as:
    Jint DestroyJavaVM(javaVM *vm);

When main thread 202 destroys virtual machine 112, native helper threads 208 detach themselves from background threads 206 and return to a native helper thread pool for assignment to other background threads 206.

Figure 3:
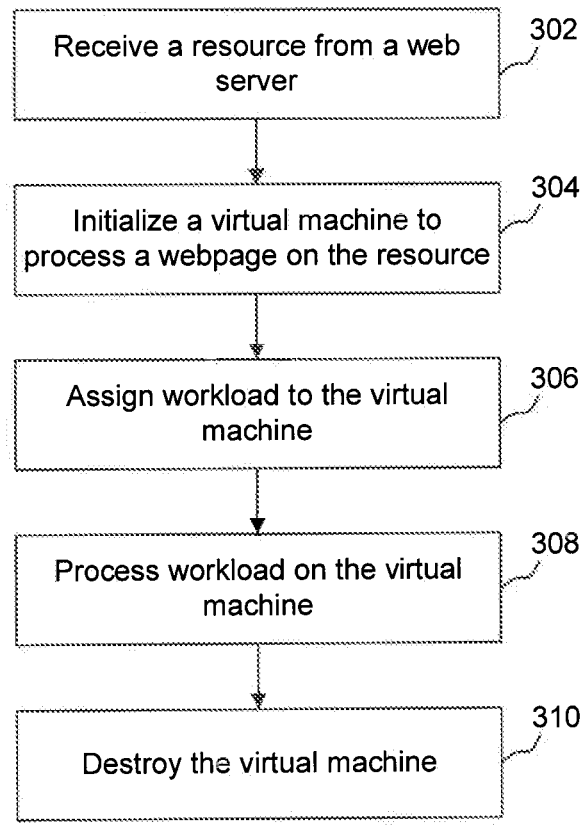
FIG. 3 is a flowchart of an exemplary method for processing resources on a multi-threaded browser.

FIG. 3 is a flowchart of an exemplary method 300 for processing resources on a multi-threaded browser.

At stage 302, resource 108 is received. For example, browser 110 receives resource 108 from web server 104.

At stage 304, virtual machine 112 is initialized. For example, main thread 202 within browser 110 initializes virtual machine 112 for each webpage 114 included in resource 108 that includes software code.

At stage 306, virtual machine 112 is assigned a workload. For example, main thread 202 attaches to UI thread 204 within virtual machine 112 and activates the event handler. The event handler retrieves the workload for UI thread 204 from the event loop of main thread 202. After the workload is assigned, main thread 202 detaches from virtual machine 112.

At stage 308, virtual machine 112 processes the workload. For example, UI thread 204 passes the workload to background threads 206, which process the workload using native helper threads 208. Stages 304-308 may be executed multiple times as browser 110 processes resource 108 received in stage 302.

At stage 310, virtual machine 112 is destroyed. For example, main thread 202 destroys virtual machine 112 when it does not have any more workload.

Cooperative Sharing of the Main Thread

Unlike conventional systems, environment 200 may context switch between virtual machines 112. Going back to FIG. 2, when main thread 202 executes an event handler in one virtual machine 112, such as virtual machine 112a, and the even handler dispatches an event that invokes an event handler in another virtual machine 112, such as virtual machine 112b, main thread 202 context switches between virtual machine 112a and virtual machine 112b. A person skilled in the art will appreciate that context switching is a programming methodology where the state of a computing process is stored in memory in such a way that the computing process can be resumed from the same point at a later time.

To facilitate context switching, main thread 202 includes a virtual machine invocation (VMI) stack 203. VMI stack 203 stores a record of invocation calls made by different virtual machines 112. For example, when main thread 202 mapped to the event handler in virtual machine 112a invokes an event handler in virtual machine 112b, main thread 202 saves the record that includes the identity and credentials of virtual machine 112a in VMI stack 203. After the record is stored in VMI stack 203, main thread 202 makes a context switch to virtual machine 112b. Main thread 202 continues to execute the event handler on virtual machine 112b until either main thread 202 completes execution or makes a context switch to another virtual machine 112.

When main thread 202 completes executing the event handler on virtual machine 112b, main thread 202 reinstates the processing on virtual machine 112a. For example, main thread 202 accesses and retrieves the record associated with virtual machine 112a from VMI stack 203. From the record, main thread 202 retrieves credentials associated with virtual machine 112a, attaches to virtual machines 112a and resumes executing the event handler on virtual machine 112a from the point just prior to the context switch.

Figure 4:
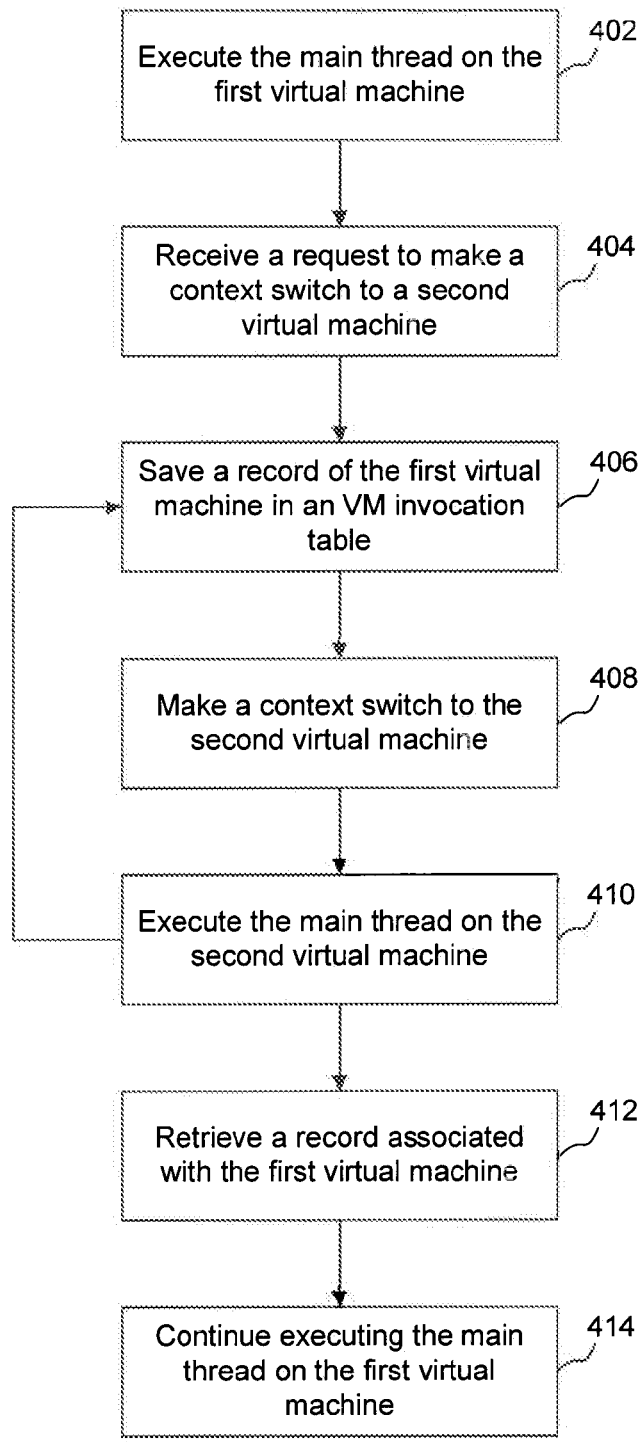
FIG. 4 is a flowchart of an exemplary method of the virtual machines cooperatively sharing a main thread.

FIG. 4 is a flowchart of an exemplary method 400 of a cooperating sharing.

At stage 402, main thread 202 executes on virtual machine 112a, that includes a UI thread 204a. For example, main thread 202 executes the event handler associated with UI thread 204a on virtual machine 112a.

At stage 404, main thread 202 receives a request to make a context switch. For example, main thread 202 receives an instruction on UI thread 204a that invokes an event handler in virtual machine 112b.

At stage 406, a record of a virtual machine 112 is saved. For example, main thread 202 saves the record associated with virtual machine 112a in VMI stack 203. The record includes an identity of virtual machine 112a and associated credentials that enable main thread 202 to resume execution on virtual machine 112a in the future.

At stage 408, main thread 202 makes a context switch. For example, main thread 202 makes a context switch to virtual machine 112b. After main thread 202 makes a context switch, main thread 202 is mapped to UI thread 204b.

At stage 410, main thread 202 executes an event handler on the second virtual machine, such as virtual machine 112b. For example, main thread 202 executes the event handler associated with UI thread 204b until the event handler requests another context switch. When another context switch is requested, main thread 202 proceeds to stage 406. In another embodiment, main thread 202 completes execution and the method proceeds to stage 412.

At stage 412, main thread 202 retrieves a record associated with virtual machine 112a from VMI stack 203.

At stage 414, main thread 202 maps to UI thread 204a and executes an event handler on virtual machine 112a.

Asynchronous Invocation Calls and Stop-the-World Operations

Virtual machine 112 may need to perform a stop-the-world event, such as a garbage collection. A garbage collection operation frees memory on client 104 that is occupied by objects, such as inactive threads, deleted data objects, etc. that are no longer used by virtual machine 112. A person skilled in the art will appreciate that the garbage collection event will free resources on client 104 and may increase its efficiency to process software code and display webpages 114.

To process a special event, such as, a stop-the-world operation, virtual machine 112 may inject an asynchronous event into the event loop on main thread 202. When main thread 202 retrieves the asynchronous event from the event loop, main thread 202 makes a context switch to virtual machine 112 that requested the event.

After main thread 202 maps to virtual machine 112, main thread 202 processes the event.

Figure 5:
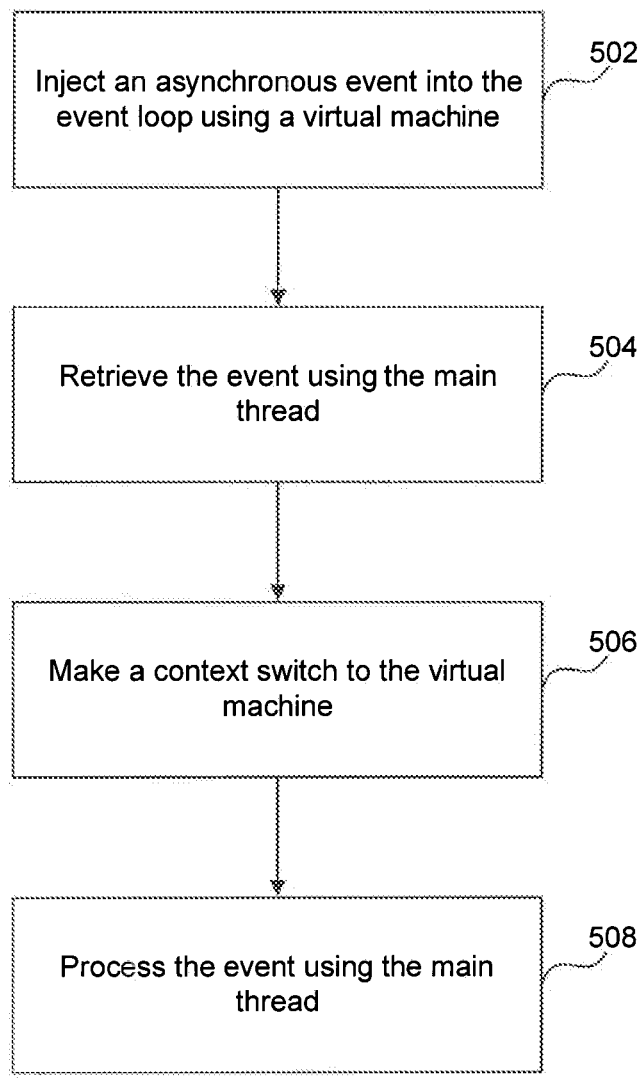
FIG. 5 is a flowchart of an exemplary method for injecting and processing an asynchronous event.

FIG. 5 is a flowchart of an exemplary method 500, for injecting and processing a stop-the-world event.

At stage 502, a stop-the-world event is injected into the main thread 202. For example, virtual machine 112 injects an event into the event loop of main thread 202 when it requires a stop-the-world event, such as garbage collection.

At stage 504, main thread 202 retrieves the event from the event loop.

At stage 506, main thread 202 makes a context switch. For example, main thread 202 makes a context switch to virtual machine 112 that made the request.

At stage 508, main thread 202 processes the event. For example, main thread 202 performs the stop-the-world event on virtual machine 112.

Figure 6:
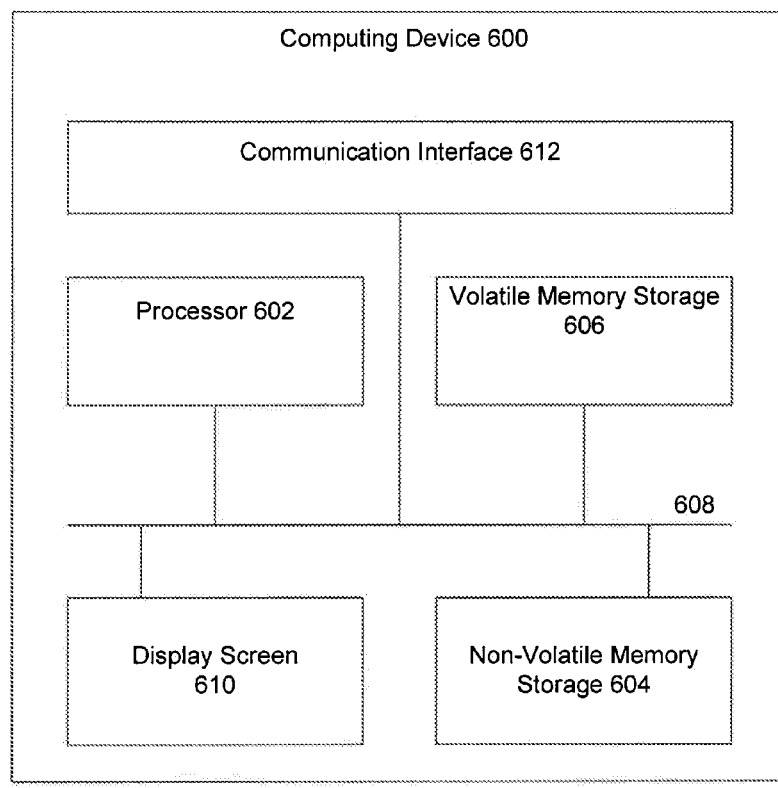
FIG. 6 is an exemplary embodiment of a computer system on which the invention may be implemented.

FIG. 6 is an example computer system 600 in which embodiments of the present invention, or portions thereof, may by implemented as computer-readable code. For example, the components or modules of system 100 may be implemented in one or more computer systems 600 using hardware, software, firmware, tangible computer readable media having instructions stored thereon, or a combination thereof, and may be implemented in one or more computer systems or other processing systems. Modules and components in FIGS. 1-5 may be embodied in hardware, software, or any combination thereof.

Computing device 600 may include one or more processors 602, one or more non-volatile storage mediums 604, one or more memory devices 606, a communication infrastructure 608, a display screen 610 and a communication interface 612. Processors 602 may include any conventional or special purpose processor, including, but not limited to, digital signal processor (DSP), field programmable gate array (FPGA), and application specific integrated circuit (ASIC). Non-volatile storage 604 may include one or more of a hard disk drive, flash memory, and like devices that may store computer program instructions and data on computer-readable media. One or more of non-volatile storage device 604 may be a removable storage device. Memory devices 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile storage medium 604 or memory devices 606.

Display screen 610 allows the results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communication path. The communication path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for processing resources on a multi-threaded browser, comprising:
   receiving a resource on the multi-threaded browser, the multi-threaded browser including a main thread;
   initializing a plurality of virtual machines for processing a plurality of code segments within the resource that includes a webpage, each virtual machine including a user interface (UI) thread;
   scheduling, using the main thread, a plurality of events for processing the plurality of code segments of the resource in parallel;
   cooperatively mapping the main thread within the multi-threaded browser to the UI thread within the virtual machine, wherein the cooperatively mapping is event driven; and
   executing the plurality of events scheduled within the main thread on the virtual machine.

2. The computer-implemented method of claim 1, wherein the main thread includes an event loop for storing the scheduled event, and the mapping is event-driven.

3. The computer-implemented method of claim 1, wherein the main thread activates an event handler within the UI thread.

4. The computer-implemented method of claim 1, further comprising the main thread passing a workload included in the event to the virtual machine.

5. The computer-implemented method for context switching on a multi-threaded browser, comprising:
   executing a first event of a plurality of events for processing a resource having a plurality of code segments using a first event handler associated with a first UI thread on a first virtual machine, the first virtual machine executing on the multi-threaded browser including a main thread;
   receiving a call to access a second event handler associated with a second UI thread on a second virtual machine, from the first event handler, and the second virtual machine executing on the multi-threaded browser in parallel with the first virtual machine;
   mapping the main thread to the first event handler to retrieve a record including a memory state of the first virtual machine prior to a context switch;
   saving a record associated with the first virtual machine on the main thread;
   context switching the main thread from the first virtual machine to the second virtual machine;
   accessing a second event from an event loop within the main thread;
   executing the second event using the second event handler associated with the second UI thread on the second virtual machine using the main thread; and restoring execution to the first virtual machine, once the execution of the second event on the second virtual machine is complete.

6. The computer-implemented method of claim 5, wherein restoring further comprises accessing the record of the first virtual machine on the main thread.

7. The computer implemented method for processing a stop-the-world event on a multi-threaded browser of a computing device, comprising:
    executing a first event of a plurality of events for processing a resource having a plurality of code segments using a first event handler associated with a first UI thread on a first virtual machine, the first virtual machine executing on the multi-threaded browser including a main thread;
    receiving the stop-the-world event on the main thread, the stop-the-world event issued by a second virtual machine, including a second UI thread, executing on the multi-threaded browser in parallel with the first virtual machine;
    saving the state of the first virtual machine on the main thread;
    asynchronously scheduling the stop-the-world event on an event loop, included in the main thread;
    retrieving the stop-the-world event from the event loop;
    accessing the second virtual machine by context switching the main thread from the first virtual machine to the second virtual machine; and
    processing the stop-the-world event using a second event handler within the second UI thread in the second virtual machine.

8. The computer-implemented method of claim 7, wherein the stop-the-world event includes a garbage collection.

9. The computer implemented method of claim 7, wherein the stop-the-world operation is event-driven.

10. The computer implemented method of claim 7, further comprising activating an event handler within the UI thread for processing the stop-the-world event.

11. The computer implemented method of claim 7, further comprising:
    restoring the processing of the main thread to the first virtual machine, once the second virtual machine completes processing the stop-the-world event.

12. A system for processing resources on a multi-threaded browser, comprising:
    a processor;
    the multi-threaded browser, implemented on the processor and configured to:
        receive a resource; and
        initialize a main thread;
    the main thread configured to:
        initialize a plurality of virtual machines for processing a plurality of code segments within the resource that includes a webpage, each virtual machine including a user interface (UI) thread;
        schedule, using the main thread, a plurality of events for processing the plurality of code segments of the resource in parallel;
        cooperatively map the main thread within the multi-threaded browser to the UI thread within the virtual machine, wherein the cooperatively mapping is event driven; and
    the plurality of virtual machines configured to:
        receive the plurality of events; and
        execute the plurality of events.

13. The system of claim 12, wherein the main thread includes an event loop for storing the plurality of events.

14. The system of claim 12, wherein the main thread is configured to activate an event handler associated with the UI thread within each virtual machine.

15. A system for context switching on a multi-threaded browser, comprising:
    a processor;
    the multi-threaded browser, implemented on the processor and configured to:
        receive a resource on the multi-threaded browser including a main thread; and
        initialize the main thread, the main thread including an event loop;
    the main thread configured to:
        execute a first event of a plurality of events for processing a resource having a plurality of code segments using a first event handler associated with a first UI thread on a first virtual machine;
        receive a call to access a second event handler associated with a second UI thread on a second virtual machine from the first event handler, and the second virtual machine executing on the multi-threaded browser in parallel with the first virtual machine;
        map the main thread to the first event handler to retrieve a record including a memory state of the first virtual machine prior to a context switch;
        save a record associated with the first virtual machine;
        context-switch from the first virtual machine to the second virtual machine;
        access a second event from an event loop within the main thread;
        execute the second event using the second event handler associated with the second UI thread on the second virtual machine; and
        restore execution to the first virtual machine, once the execution of the second event on the second virtual machine is complete.

16. The system of 15, wherein the main thread is further configured to access the record of the first virtual machine to restore the execution.

17. A system for processing a stop-the-world event on a multi-threaded browser of a computing device, comprising:
    a processor;
    a main thread of the multi-threaded browser of the computing device, the multi-threaded browser implemented on the processor, configured to:
    execute a first event of a plurality of events for processing a resource having a plurality of code segments using a first event handler associated with a first UI thread on a first virtual machine, the first virtual machine executing on the multi-threaded browser including a main thread;
    receive the stop-the-world event on the main thread, the stop-the-world event issued by a second virtual machine, including a second UI thread, executing on the multi-threaded browser in parallel with the first virtual machine;
    save the state of the first virtual machine on the main thread;
    asynchronously schedule the stop-the-world event on an event loop, included in the main thread;
    retrieve the stop-the-world event from the event loop;
    access the second virtual machine by context switching the main thread from the first virtual machine to the second virtual machine; and
    process the stop-the-world event using a second event handler within the second UI thread in the second virtual machine.

18. The system of claim 17, wherein the stop-the-world event includes garbage collection.

19. The system of claim 17, wherein the stop-the-world operation is event driven.

20. The system of claim 17, wherein the UI thread is further configured to activate an event handler within the UI thread for processing the stop-the-world event.

21. The system of claim 17, wherein the main thread is further configured to:
restore the processing of the main thread to the first virtual machine, once the second virtual machine completes processing the stop-the-world event.

22. An article of manufacture including a non-transitory computer-readable medium having instructions stored thereon that, when executed by a computing device, cause the computing device to perform operations for processing resources on a multi-threaded browser, comprising:
receiving a resource on the multi-threaded browser, the multi-threaded browser including a main thread;
initializing a plurality of virtual machines for processing a plurality of code segments within the resource that includes a webpage, each virtual machine including a user interface (UI) thread;
scheduling, using the main thread, a plurality of events for processing the plurality of code segments of the resource in parallel;
cooperatively mapping the main thread within the multi-threaded browser to the UI thread within the virtual machine, wherein the cooperatively mapping is event driven; and
executing the plurality of events scheduled within the main thread on the virtual machine.

23. An article of manufacture including a non-transitory computer-readable medium having instructions stored thereon that, when executed by a computing device, cause the computing device to perform operations for context switching on a multi-threaded browser, the operations comprising:
executing a first event of a plurality of events for processing a resource having a plurality of code segments using a first event handler associated with a first UI thread on a first virtual machine, the first virtual machine executing on the multi-threaded browser including a main thread;
receiving a call to access an event handler associated with a second UI thread on a second virtual machine, and the second virtual machine executing on the multi-threaded browser in parallel with the first virtual machine, from the event handler associated with the first virtual machine, the second virtual machine executing on the multi-threaded browser;
mapping the main thread to the first event handler to retrieve a record including a memory state of the first virtual machine prior to a context switch;
saving a record associated with the first virtual machine on the main thread, the record including the state of the first virtual machine;
context switching the main thread from the first virtual machine to the second virtual machine;
accessing a second event from an event loop within the main thread;
executing the second event using the second event handler associated with the second UI thread on the second virtual machine, wherein the second event is accessed from the event loop within the main thread; and
restoring execution to the first virtual machine, once the execution on the second virtual machine is complete.

24. An article of manufacture including a non-transitory computer-readable medium having instructions stored thereon that, when executed by a computing device, cause the computing device to perform operations for processing a stop-the-world event on a multi-threaded browser, the operations comprising:
executing a first event of a plurality of events for processing a resource having a plurality of code segments using a first event handler associated with a first UI thread on a first virtual machine, the first virtual machine executing on the multi-threaded browser including a main thread;
receiving the stop-the-world event on the main thread, the stop-the-world event issued by a second virtual machine, including a second UI thread, executing on the multi-threaded browser in parallel with the first virtual machine;
saving the state of the first virtual machine on the main thread;
asynchronously scheduling the stop-the-world event on an event loop of the main thread, the event loop included in the main thread;
retrieving the stop-the-world event from the event loop;
accessing the second virtual machine by context switching the main thread from the first virtual machine to the second virtual machine; and
processing the stop-the-world event using a second event handler within the second UI thread in the second virtual machine.

* * * * *